United States Patent

Baur et al.

Patent Number: 5,232,605
Date of Patent: Aug. 3, 1993

[54] BREAKDOWN OF WASTE WATERS CONTAINING AROMATIC NITRO COMPOUNDS

[75] Inventors: Karl G. Baur, Ludwigshafen; Toni Dockner, Meckenheim; Ulrich Kanne, Frankenthal; Thomas Papkalla, Mannheim, all of Fed. Rep. of Germany

[73] Assignee: BASF Aktiengesellschaft, Ludwigshafen, Fed. Rep. of Germany

[21] Appl. No.: 843,811

[22] Filed: Feb. 28, 1992

[30] Foreign Application Priority Data

Mar. 13, 1991 [DE] Fed. Rep. of Germany ....... 4107972

[51] Int. Cl.$^5$ .............................................. C02F 1/72
[52] U.S. Cl. ...................................... 210/761; 210/909
[58] Field of Search ........................ 210/761, 762, 909

[56] References Cited

U.S. PATENT DOCUMENTS 4,347,144 8/1982 Bodenbenner et al. ............. 210/761
5,011,614 4/1991 Gresser et al. ...................... 210/761

FOREIGN PATENT DOCUMENTS 0338478 4/1989 European Pat. Off. .
0442088 12/1990 European Pat. Off. .

OTHER PUBLICATIONS

Produktionsintegrierter Umweltschutz in der chemischen Industrie, Dechema, GVC, SATW, pp. 63-64.

*Primary Examiner*—Ivars Cintins
*Attorney, Agent, or Firm*—John H. Shurtleff

[57] ABSTRACT

A process for breaking down aromatic nitro compounds in waste waters from plants for the production of nitrobenzene by treatment with nitric acid is carried out at from 180° to 350° C. and under a pressure of from 40 to 250 bar.

8 Claims, No Drawings

BREAKDOWN OF WASTE WATERS CONTAINING AROMATIC NITRO COMPOUNDS

The present invention relates to a process for breaking down aromatic nitro compounds in waste waters from plants for the production of nitrobenzene by treatment with nitric acid under pressure.

A process for the treatment of nitrobenzene waste waters is disclosed in Produktionsintegrierter Umweltschutz in der chemischen Industrie, DECHEMA, GVC, SATW, pages 63-64. The waste water is heated to about 300° C. using a heat exchanger under an operating pressure of 120 bar, and is conveyed into a reactor and then cooled and decompressed. During this the nitrophenol content decreases to below 10 ppm. Breakdown products of the thermal decomposition are carbon dioxide plus carboxylic and dicarboxylic acids such as oxalic, succinic and benzoic acids. However, this process is unsatisfactory.

We have accordingly found a novel and improved process for breaking down aromatic nitro compounds in waste waters from plants for the production of nitrobenzene by treatment with nitric acid, which comprises operating at from 180° to 350° C. and under a pressure of from 40 to 150 bar.

The process can be carried out as follows:

The waste water is introduced into pressure vessels at from 180° to 350° C., preferably 250° to 290° C., under a pressure of from 40 to 250 bar, preferably 70 to 130 bar, adjusting the nitric acid content to from 0.3 to 10% by weight, preferably 0.5 to 5% by weight, by adding nitric acid. The amount of nitric acid added also depends on the amount of aromatic nitro compounds in the waste water.

The nitric acid can be from 10 to 70% by weight aqueous nitric acid, preferably from 30 to 70% by weight technical aqueous nitric acid.

Suitable pressure vessels are tubular reactors or autoclaves arranged in a cascade.

In a preferred embodiment, the waste water is conveyed by pump through a heat exchanger in which it is preheated to 270° C. The preheated waste water is then heated to 290° C. by directly feeding in steam under 100 bar or by indirect heating. After the concentration of nitric acid has been adjusted to, for example, 1.5% in the waste water at 290° C. the latter is conveyed through a reactor without back mixing (e.g. tubular reactor with internal fittings and lined with titanium). After a holdup time of from 4 to 8 min the reaction solution is cooled in countercurrent with the feed and decompressed.

Preferably used to carry out the process continuously is a tubular reactor in which the liquid flow is adjusted so that there is no back mixing.

The process according to the invention is particularly used to clean up the waste water from nitrobenzene production. However, since nitrobenzene is also used to extract residual aniline in the waste water from the production of aniline from nitrobenzene, and the resulting waste waters may together be subjected to the nitric acid treatment, the water requiring treatment may also contain small amounts of aniline. This is broken down in the process according to the invention.

The addition of small amounts of nitric acid to the waste water in the thermal treatment reduces the nitrophenol content to below 1 ppm with, at the same time, a breakdown in TOC (TOC=total organic carbon) >95%. It is possible without difficulty to dispose of this waste water in a biological treatment plant. The advantage of this method compared with purely thermal treatment of the nitrobenzene waste water is the breakdown in the nitrophenols to below 1 ppm and a considerable reduction in the TOC content. The addition of nitric acid results in the breakdown products of the nitrophenols, the carboxylic and dicarboxylic acids, being substantially broken down to carbon dioxide. Furthermore, this method displays great flexibility with respect to variations in the composition of the waste water. When the content of pollutants is high it is necessary merely to increase the amount of nitric acid to comply with the levels in the waste water. It is noteworthy in this connection that even dilute nitric acid has a sufficient oxidizing potential to oxidize organic carbon to carbon dioxide.

EXAMPLE

A waste water with the composition indicated below was treated in a tubular reactor under the following conditions:

Temperature: 280°-290° C.
Pressure: 95 bar
Added nitric acid: 1.5% by weight
Holdup time: 5 min.

| Analyses: Analysis of the waste water | | | |
|---|---|---|---|
| A) before treatment | | B) after treatment | |
| TOC content: | 355 mg/l | TOC content: | 17 mg/l |
| Nitrobenzene: | 2 mg | Nitrobenzene: | 6 mg/l |
| 2,6-Dinitrophenol: | 53 mg/l | 2,6-Dinitrophenol: | <100 ppb |
| 2,4-Dinitrophenol: | 485 mg/l | 2,4-Dinitrophenol: | <100 ppb |
| Picric acid: | 117 mg/l | Picric acid: | <50 ppb |

We claim:

1. In a process for breaking down nitrophenol compounds in a waste water from plants for the production of nitrobenzene, the improvement which comprises:
   treating said waste water by adjusting its content of nitric acid to a value of from 0.3 to 10% by weight and heating the waste water containing these small amounts of nitric acid at a temperature of from 180° to 350° C. and under a pressure of from 40 to 250 bar.

2. A process as claimed in claim 1, which is carried out at from 250° to 290° C.

3. A process as claimed in claim 1, which is carried out from a pressure of from 70 to 130 bar.

4. A process as claimed in claim 1, wherein the adjusted amount of nitric acid in the waste water being treated is sufficient to reduce the content of said nitrophenol compounds to a value below 1 ppm.

5. A process as claimed in claim 1, wherein the adjusted amount of nitric acid in the waste water being treated is from 0.5 to 5% by weight.

6. A process as claimed in claim 1, wherein the treatment of the waste water with nitric acid is carried out continuously in a tubular reactor without back mixing.

7. A process as claimed in claim 1, wherein the heating temperature is from 250° to 290° C. and the pressure is from 70 to 130 bar.

8. A process as claimed in claim 1, wherein the waste water from the production of nitrobenzene is combined with waste water from the production of aniline from nitrobenzene for said treatment with nitric acid.

* * * * *